UNITED STATES PATENT OFFICE.

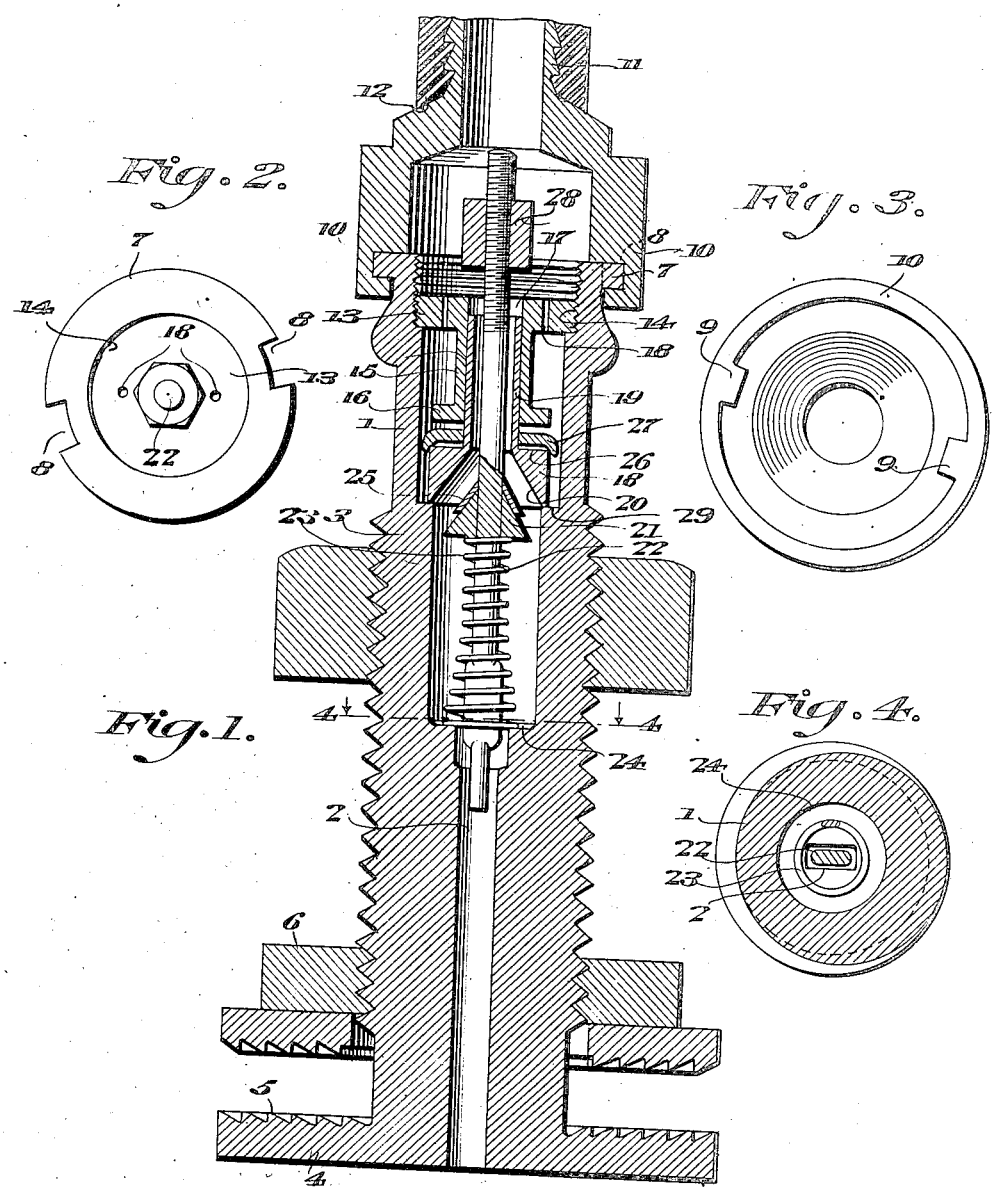

JAMES A. REASONER, OF PARKERSBURG, WEST VIRGINIA, ASSIGNOR OF ONE-THIRD TO ELDORUS McCOY AND ONE-THIRD TO V. O. HAVENNER.

VALVE FOR PNEUMATIC TIRES.

1,126,568.

Specification of Letters Patent.

Patented Jan. 26, 1915.

Application filed April 22, 1914. Serial No. 833,717.

*To all whom it may concern:*

Be it known that I, JAMES A. REASONER, a citizen of the United States, residing at Parkersburg, in the county of Wood and State of West Virginia, have invented new and useful Improvements in Valves for Pneumatic Tires, of which the following is a specification.

This invention relates to valves for pneumatic tires, the object in view being to produce a reliable valve of the class referred to which will effectively prevent the escape of air from the inner tube of a pneumatic tire and which may be clamped tightly in closed position to prevent the same from jarring or working loose.

With the above and other objects in view, the invention consists in the novel construction, combination and arrangement of parts, as will be hereinafter more fully described, illustrated and claimed.

In the accompanying drawings:—Figure 1 is a longitudinal diametrical section through the valve of this invention. Fig. 2 is an outer end view thereof. Fig. 3 is a detail view of the air hose coupling. Fig. 4 is a cross section through the valve on the line 4—4 of Fig. 1.

Referring to the drawings 1 designates the valve casing which is of tubular construction, being provided in its inner end portion with a relatively small central longitudinal bore 2 forming an air passage and with a relatively large bore 3 in the outer end portion thereof forming a valve chamber. At its inner end the valve casing 1 is provided with an attaching base flange 4 shown as provided with a serrated clamping face 5 against which the wall of an inner tube is adapted to be clamped by the usual nut 6. At its outer end the valve casing 1 is provided with a flange 7 formed with notches 8, the said notches being adapted to receive a plurality of tongues 9 on the inner end of an air hose coupling 10 having an externally serrated neck 11 of tubular form to receive the adjacent end of an air hose 12 from a suitable source of compressed air supply. The tongues 9 are inserted through the notches 8 and the coupling turned until said tongues are held under the flange 7.

The outer end of the casing 1 is internally threaded at 13 to receive a stationary valve seat guide 14 formed with a sleeve-like extension 15 of tubular construction at the inner end of which is an abutment flange 16. The stationary valve seat guide is thus provided with a central longitudinal guide opening 17 and is further provided with one or more auxiliary air ports 18 which act in conjunction with the central opening 17 to allow air to pass inwardly and outwardly.

18 designates a valve seat which is movable longitudinally of and within the casing 1, said valve seat being provided with a tubular guiding extension 19 which is slidable in the central opening 17 of the guide. The valve seat is provided with a conical working face 20 movable toward and from which is a cone-shaped valve 21 fast on a valve stem 22 the inner end of which is guided by the bore 2 above referred to and the outer end portion of which extends through and is guided by the tubular extension 19 of the valve seat. The valve 21 is normally held closed by means of a coiled expansion spring 23 one end of which bears against the shoulder 24 at the junction of the bore 2 and valve chamber 3, the other end of said spring bearing against the body and back of the valve 21. A conical gasket or valve face 25 is applied to the working face of the valve 21, the same closely encircling the stem 22 and being adapted to fit tightly against the working face 20 of the valve seat 18. The valve seat 18 is further provided with an abutment face or shoulder 26 and an expansion washer or packing disk 27 is interposed between the abutment face 26 and the abutment flange 16 above referred to, said washer acting under the pressure exerted against the same by the valve seat 18 as it is pressed outwardly by the air in the tire, to expand, forcing the marginal edge or periphery of said washer against the inside wall of the casing and thereby preventing air from escaping around the valve seat and through the port or ports 18 in the valve seat guide 14.

A clamping nut 28 is threaded on the projecting outer end of the valve stem 22 and adapted to be turned up tightly against the guide 14, whereupon the valve 21 is drawn tightly against the valve seat 18 and the latter is drawn toward the abutment flange 16 until the washer 18 is expanded into airtight contact with the casing. To inflate a tire, the clamping nut 28 is loosened and the air hose connected to the valve casing. In each active stroke of the compressor, the valve 21 is unseated and the valve seat is also moved away from the abutment flange 16. Air is thus permitted to pass through the valve seat and valve seat guide and also around the valve seat thus facilitating the inflation of the tire by giving an increased inflow capacity to the valve. By removing the valve seat guide 14, all of the working parts of the valve may be withdrawn from the casing for repair, adjustment or renewal. The inward movement of the valve seat is limited by an internal annular stop shoulder 29 with the casing 1.

What I claim is:—

1. A valve of the class set forth comprising a tubular valve casing, a stationary valve seat guide therein, an air pressure operable valve seat movable longitudinally of and within said casing in coöperation with said guide, an expansion washer between said valve seat and valve seat guide adapted when compressed to lie in contact with the interior wall of said casing, a valve movable toward and away from said seat, and a valve stem slidable through said valve seat and guide.

2. A valve of the class set forth comprising a tubular valve casing, a stationary valve seat guide therein, an air pressure operable valve seat movable longitudinally of and within said casing in coöperation with said guide, an expansion washer between said valve seat and valve seat guide adapted when compressed to lie in contact with the interior wall of said casing, a valve movable toward and away from said seat, a valve stem slidable through said valve seat and guide, and a clamping nut on said valve stem adapted to draw said valve tightly against the valve seat and simultaneously expand said washer into contact with the casing.

3. A valve of the class set forth comprising a tubular valve casing, a stationary valve seat guide therein provided with a central guide opening and also formed with an air port, an air pressure operable valve seat movable longitudinally of and within said casing in coöperation with said guide, a valve movable toward and away from said seat, a valve stem slidable through said valve seat and guide, and an expansion washer between said valve seat and valve seat guide adapted when compressed to lie in contact with the interior wall of said casing.

In testimony whereof I affix my signature in presence of two witnesses.

JAMES A. REASONER.

Witnesses:
MABEL E. HIEHLE,
JOHN MARSHALL.